United States Patent
Chen et al.

(10) Patent No.: US 9,329,711 B2
(45) Date of Patent: May 3, 2016

(54) INFORMATION PROCESSING METHOD AND APPARATUS FOR A TOUCH SCREEN DEVICE

(71) Applicant: International Business Machines Corporation, Armonk, NY (US)

(72) Inventors: Guan Cheng Chen, Beijing (CN); Haibo Lin, Beijing (CN); Tao Liu, Beijing (CN); Xu U. Wang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 17 days.

(21) Appl. No.: 13/943,194

(22) Filed: Jul. 16, 2013

(65) Prior Publication Data

US 2014/0022175 A1 Jan. 23, 2014

(30) Foreign Application Priority Data

Jul. 20, 2012 (CN) .......................... 2012 1 0253480

(51) Int. Cl.
*G06F 3/041* (2006.01)
*G06F 3/0488* (2013.01)

(52) U.S. Cl.
CPC ............ *G06F 3/041* (2013.01); *G06F 3/04886* (2013.01)

(58) Field of Classification Search
CPC ....... G06F 3/044; G06F 3/041; G06F 3/0412; G06F 3/0416
See application file for complete search history.

(56) References Cited

U.S. PATENT DOCUMENTS

| | | | |
|---|---|---|---|
| 2003/0193478 A1 | 10/2003 | Ng et al. | |
| 2006/0085757 A1 | 4/2006 | Andre et al. | |
| 2007/0063984 A1 | 3/2007 | Chung | |
| 2008/0042979 A1 | 2/2008 | Nikbin | |
| 2009/0237359 A1* | 9/2009 | Kim et al. | 345/168 |
| 2010/0149103 A1 | 6/2010 | Betts-LaCroix | |
| 2010/0333011 A1 | 12/2010 | Kornev et al. | |
| 2011/0157090 A1 | 6/2011 | Parihar et al. | |
| 2011/0242137 A1 | 10/2011 | Lee et al. | |
| 2011/0300912 A1 | 12/2011 | Kim et al. | |
| 2012/0081321 A1* | 4/2012 | Baek | 345/173 |
| 2014/0009403 A1* | 1/2014 | Tremblay et al. | 345/173 |

FOREIGN PATENT DOCUMENTS

| | | |
|---|---|---|
| CN | 101021763 A | 8/2007 |
| CN | 101038515 A | 9/2007 |
| CN | 101059742 A | 10/2007 |
| CN | 101142617 A | 3/2008 |
| EP | 2381341 A2 | 10/2011 |

* cited by examiner

*Primary Examiner* — Kenneth B Lee, Jr.
(74) *Attorney, Agent, or Firm* — Cantor Colburn LLP

(57) ABSTRACT

An information processing method for a touch screen device includes in response to contact of a user's finger with a touch screen of the touch screen device, identifying the finger contacting the touch screen; determining key(s) corresponding to the identified finger based on set correspondence relationship(s) between the finger(s) and the key(s); and displaying at least one character represented by the key(s) corresponding to the identified finger.

8 Claims, 4 Drawing Sheets

INFORMATION PROCESSING METHOD AND APPARATUS FOR A TOUCH SCREEN DEVICE

PRIORITY

This application claims priority to Chinese Application No. 201210253480.3, filed Jul. 20, 2012, and all the benefits accruing therefrom under 35 U.S.C. §119, the contents of which in its entirety are herein incorporated by reference.

BACKGROUND

The present invention relates to the field of touch identification, and more specifically, relates to an information processing method and apparatus for a touch screen device, and the touch screen device.

With the constant advancement of technologies, touch screen devices have gained increasingly wide application, for example, a popular touch screen mobile phone or touch screen pad, etc.

Because a touch screen device is easily manipulated, it is not only widely applied in the field of personal devices, but also appears in fields such as industrial control, office, and information presentation, etc. However, rapid and acute input of characters may become difficult when using a touch screen device.

It is seen that in the existing touch screen devices, a virtual keypad is generally adopted as an input means of characters. Some virtual keypads are arranged as a real keypad, while some virtual keypads are arranged in a Sudoku manner. However, all of the above approaches require users to glare at the virtual keypad for input, thereby realizing an accurate input, because virtual keypads have no tactile sense of a real keypad; therefore, if a user does not glare at the virtual keypad, he/she would not know whether he/she touches the desired key. As a result, input speed is dramatically lowered.

In order to solve this problem, an external physical keyboard for the touch screen device has been proposed. Because a physical keypad has a real tactile sense, it can improve the input speed. However, one problem associated with this approach is the need an extra device which is not portable friendly.

SUMMARY

In one embodiment, an information processing method for a touch screen device includes: in response to contact of a finger of a user with a touch screen of the touch screen device, identifying the finger contacting the touch screen; determining key(s) corresponding to the identified finger based on set correspondence relationship(s) between the finger(s) and the key(s); displaying at least one character represented by the key(s) corresponding to the identified finger.

In another embodiment, an information processing apparatus for a touch screen device includes: an identifying module configured to, in response to contact of a finger of a user with a touch screen of the touch screen device, identify the finger contacting the touch screen; a determining module configured to determine key(s) corresponding to the identified finger based on set correspondence relationship(s) between the finger(s) and the key(s); and a displaying module configured to display at least one character represented by the key(s) corresponding to the identified finger.

In another embodiment a touch screen device includes: a touch screen and the above-mentioned information processing apparatus for a touch screen device.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

In order to improve the input speed of a touch screen device, embodiments of the present invention provide an information processing method and apparatus for a touch screen device, and a touch screen device. The technical solutions as proposed in the present invention embodiments may improve input speed of a touch screen device without an additional device.

Some exemplary embodiments will be described in more detail with reference to the accompanying drawings, in which the exemplary embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
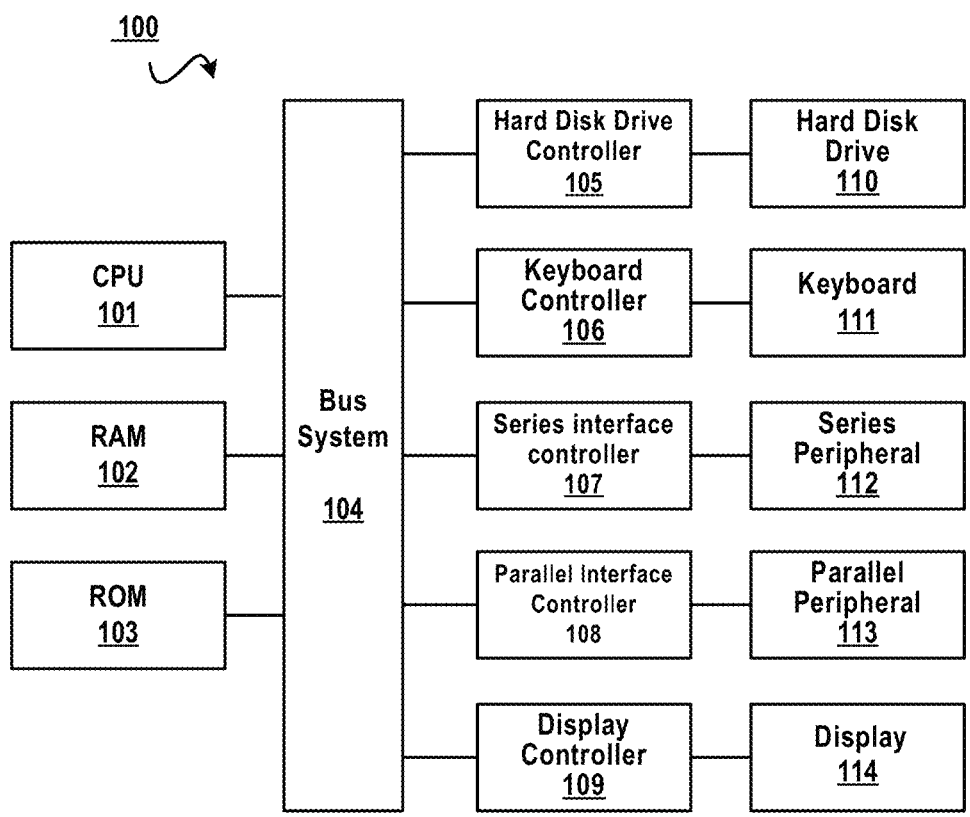
FIG. 1 shows an exemplary computer system which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combination(s) of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
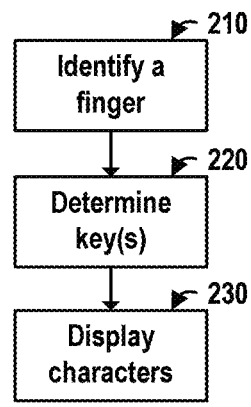
FIG. 2 shows a flowchart diagram of an information processing method for a touch screen device according to embodiments of the present invention.

Now, referring to FIG. 2, there is shown an information processing method for a touch screen device as provided in the embodiments of the present invention. The method includes: operation 210, in response to contact of a finger of a user with a touch screen of the touch screen device, identifying the finger contacting the touch screen; operation 220, determining a key corresponding to the identified finger based on set correspondence relationship(s) between finger(s) and the key(s); operation 230, displaying at least one character represented by the key corresponding to the identified finger.

Various embodiments of the present invention do not specifically limit the form of the touch screen device, which may be a mobile phone, a pad, or other device.

Various embodiments of the present invention do not limit the specific contact manner between a finger and a touch screen, which may be an actual contact between the finger and the touch screen, or in a way of putting the finger above the touch screen such that the touch screen infrared senses the finger. Those skilled in the art would appreciate that the contact between the finger and the touch screen may be in other manners.

In the embodiments of the present invention, prior art may be adopted to identify a finger contacting a touch screen, for example, the specific finger used by the user to contact the touch screen, for example, what is used in the middle finger on the left hand or index finger of the right hand, based on one or more of the parameters such as the direction of the finger contacting the touch screen, the width of the contact portion, the length of the contact portion, the area of the contact portion, the shape of the contact portion, the relative position of the finger with respect to the palm, as well as the relative position between fingers, etc. In one embodiment of the present invention, there further comprises a training operation for finger identification, for example, the user uses a finger corresponding to a prompt to contact the touch screen, thereby improving the accuracy of finger identification.

In the embodiments of the present invention, keys of a keypad may be grouped such that different fingers correspond to different groups; such correspondence relationship(s) is (are) either preset, set by the user or adjusted by the user according to the presetting. In the correspondence relationship(s) of the embodiments of the present invention, a finger may correspond to a plurality of keys, and a plurality of fingers may also correspond to the same key, or a plurality of keys corresponding to different fingers may be partially identical; the present invention has no limitation thereto. Corresponding key(s) may also be set for all fingers; or corresponding key(s) may be only set for some fingers thereof; the present invention has no limitation thereto. In one embodiment of the present invention, the correspondence relationship(s) between finger(s) and key(s) may be set in the following manner: the little finger of the left hand corresponds to keys Q, A, Z; the ring finger of the left hand corresponds to keys W, S, Z; the middle finger of the left hand corresponds to keys E, D, C; the index finger of the left hand corresponds to keys R, F, V, T, G, B; the index finger of the right hand corresponds to keys Y, U, H, J, N; the middle finger of the right hand corresponds to the keys I, K, M; the ring finger of the right hand corresponds to keys O, P, L; the little finger of the right hand corresponds to keys Return/Enter; the thumbs of the left and the right hand both correspond to the key Space. It is seen that based on the correspondence relationship(s) between different finger(s) and key(s), key(s) corresponding to the identified finger can be determined. Take the above example as an example, the user uses the middle finger of the left hand to contact the touch screen; then in response to the contact, it may be identified that the user uses the middle finger of the left hand; while in the set correspondence relationship, the middle key of the left hand corresponds to keys E, D, C; therefore, it may be determined that the keys corresponding to the identified finger are E, D, C. For the convenience of description, the correspondence relationship(s) is(are) also used in the following embodiments as an example, but the correspondence relationship(s) is(are) merely exemplified and do not constitute a limitation to the scope of the present invention.

In the embodiments of the present invention, because the key(s) corresponding to the identified finger has(have) been determined, the content which the user desires to input is clear, and thus at least one character represented by the corresponding key may be displayed. Still take the above example as an example, when it is determined that the keys corresponding to the identified finger are E, D, C, E, D, C may all be displayed, or only one or more thereof are displayed.

In the embodiments of the present invention, the relationship between the keys and the represented characters may be changed. For example, after the user enters a digit/character switching key, the character represented by the key E may be 3, instead of E. For example, after the user enters the upper case/lower case switching key, the character represented by the key E will be switched from E to e or from e to E. For example, after the user enters the Chinese/English switching key, the character represented by the key V will be ü in Chinese pinyin, or stroke "-".

It is seen that the method as provided in the present embodiment does not require the user to contact a virtual key on the touch screen, i.e., it will not limit the position where the user contacts the touch screen to a displayed virtual key, and the user may contact any position of the touch screen. In this way, it would be unnecessary for the user to glare at the touch screen to perform input. In other words, it completely changes the input pattern in the prior art where the user uses a finger to search for a corresponding key. For example, in the prior art, if the user intends to input E, he/she has to contact the position where the virtual key "E" is located; if the user does not glare at the touch screen, he/she probably contact the positions of other keys or does not contact a virtual key at all; however, the method as provided in the embodiments of the present invention enable the user to realize the input of the key "E" by just touching the touch screen with the middle finger of the left hand, without bother to search for the position of the virtual key; further, it would not be deemed that a key corresponding to other finger is input, thereby reducing the possibility of error pressing and greatly improving the input speed. Further, because it is not required to display the virtual keypad, the space of the screen as required for input may be saved. It may be seen that it is simple and easy to implement or specifically utilize the method, without imposing additional burden. Meanwhile, this method does not require an external real keypad, thereby avoiding the need of an additional device.

In one embodiment of the present invention, the operation 230 may include at least one of the following operations: displaying in a to-be-input area at least one of characters represented by the key corresponding to the identified finger; displaying in a to-be-selected area at least one of the characters represented by the key corresponding to the identified finger; and displaying all characters represented by the key corresponding to the identified finger.

In one embodiment of the present invention, a to-be-input area may be comprised in the display of the screen. The to-be-input area comprises an area waiting for user's input. For example, in the case of requiring input of a website, the address field of a browser is the area waiting for input; in the case of text edition, the position of the cursor is the to-be-input area. When the user contacts the touch screen to perform input, corresponding input may be displayed in the to-be-input area. Because one finger may correspond to a plurality of keys, the key(s) corresponding to the identified finger could be plural, and the corresponding characters represented thereby may also be plural. Optionally, it is allowed to merely display one of such plurality of characters in the to-be-input area. Optionally, when only one of the plurality of characters is displayed in the to-be-input area, the character may be underlined to represent that the character is only a temporal selection, not a final selection of the user.

In one embodiment of the present invention, a to-be-selected area may be comprised in the display of the screen. The to-be-selected area comprises an area displaying the content waiting for user's selection. The to-be-selected area may be adjacent to the to-be-input area or may be a fixed place; the present invention does not limit the position of the to-be-selected area. The character or a combination of characters as displayed in the to-be-selected area may wait for the user to perform a final selection. Optionally, possible combination(s) of the characters already existing in the to-be-selected area and the characters represented by the key(s) corresponding to the identified finger may be determined, and at least one of the possible combination(s) is displayed in the to-be-selected area. For example, in one input, the user first uses the middle finger of his/her left hand to contact the touch screen, and then uses the index finger of his/her right hand to contact the touch screen. Still take the above example as an example, the keys corresponding to the first contact are E, D, C, and the keys corresponding to the second contact are Y, U, H, J, N. For the first input, E, D, C may be directly displayed in the to-be-selected area. For the second contact, in the case that the to-be-selected area already has E, D, C, then the possible combinations are EY, EU, EH, EJ, EN, DY, DU, DH, DJ, DN, CY, EU, CH, CJ, and CN. All of the above combinations or some very common combinations, for example, CH and EN, may be displayed in the to-be-selected area. Of course, it is possible that there is only one combination in the to-be-selected area, for example, in the case that there is only one possible combination, or rules prescribe only displaying one combination, or other scenarios. Those skilled in the art would appreciate that for a Chinese input method, possible combination(s) of corresponding pinyin may be displayed on the to-be-selected area, or possible combination(s) of Chinese characters/phrases may be directly displayed. If a combination which the user desires to select is not displayed in the to-be-selected area, other possible combination(s) that is (are) not displayed in the to-be-selected area may be displayed through a scrolling operation, etc., for example. Optionally, a combination which is more common or has a higher user selection frequency has a higher possibility to be displayed in the to-be-selected area, and the displayed position is higher.

In the embodiments of the present invention, in order to enable the user to maker clearer about the key(s) corresponding to the present contact, all characters represented by the key(s) corresponding to the identified finger may be displayed. For example, when the user uses the little finger of his/her left hand to contact the touch screen, Q, A, Z may be displayed. In practice, they may be displayed adjacent to the contact area between the finger and the touch screen or displayed in other places of the screen; the present invention has no limitation thereto. Optionally, the display may be semi-transparent. Optionally, the display may continue for a certain period of time before disappearing. Through selecting at least one of the two optional solutions, it enables the user to make clear about the key(s) corresponding to the present contact, without affecting the original display in the screen. The user may set whether to display the key(s) corresponding to the present contact, and when the user has become familiar with the correspondence relationship(s) between finger(s) and key(s), he/she may select to close the display.

Figure 3:
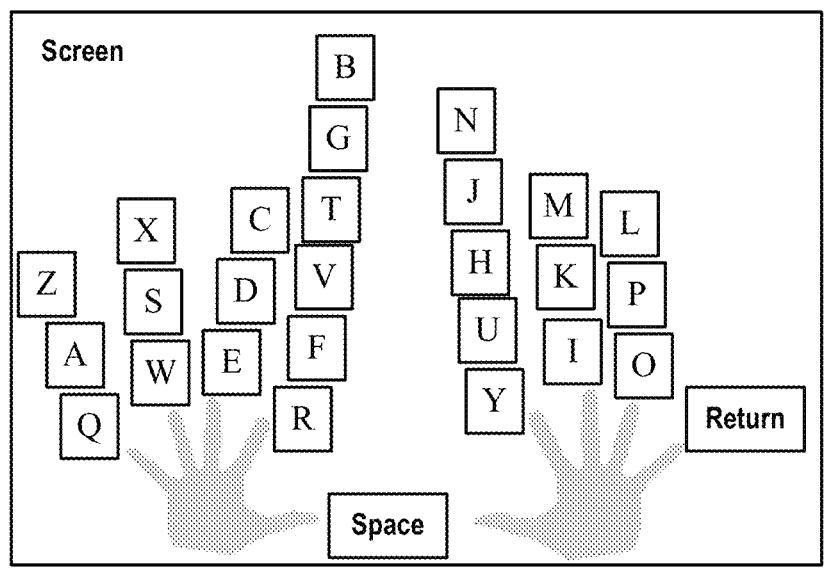
FIG. 3 shows a diagram of a finger-key correspondence relationship according to the embodiments of the present invention.

In one embodiment of the present invention, correspondence relationship(s) between finger(s) and key(s) may be further displayed, such that the user can determine which finger should be used to perform input. As illustrated in FIG. 3, different finger(s) and the key(s) corresponding to the finger(s) may be displayed in the screen. Optionally, the display may be semi-transparent, so that the display of the original content in the screen will not be affected. Optionally, when the user has become familiar with the correspondence relationship(s) between the finger(s) and key(s), he/she may select to close the display.

In one embodiment of the present invention, the method further comprises: in response to determining that the contact of the finger of the user with the touch screen is to perform a selection, displaying the selected character. Because a finger may correspond to a plurality of keys, an opportunity for selection is available to the user. Specifically, the user may perform selection among the key(s) corresponding to the contact after each contact, or the user may select among possible combination(s) after a plurality of contacts. The present embodiment may be combined with the aforementioned embodiment where the screen display comprises a to-be-selected area. Optionally, any contact in the to-be-selected area is determined as performing selection. Optionally, the to-be-selected area may be set as a fixed area; then the contact in the fixed area is determined as performing selection. Optionally, a particular finger maybe set to perform selection only, as a result, if it is determined that it is the particular finger touching the touch screen, then the touch is determined as performing selection. Optionally, selection may be performed based on different gestures. For example, waving hand to the left represents selecting the first combination, while waving hand to the right represents selecting the second combination, etc. Those skilled in the art would appreciate that whether this contact is to perform selection may also be determined through other manners, which will not be detailed here for concise. Moreover, this operation may also be performed before the identifying operation, after the identifying operation, or simultaneously with the identifying operation.

In one embodiment of the present invention, the information processing method for the touch screen device further comprises: in response to the user terminating the input, clearing the to-be-selected area. Optionally, the user may represent termination of input through a particular key, for example, using Return or Enter or Space or other particular key to represent termination of input. Optionally, the user may represent termination of input through selecting a character or a combination of characters in the to-be-selected area. After the user terminates the input, clearing the to-be-selected area may facilitate the user to perform next input, thereby avoiding the previous characters from still staying in the to-be-selected area.

In one embodiment of the present invention, the screen may be further divided into different spaces. In different spaces, the correspondence relationship(s) between finger(s) and key(s) are different. The information processing method for the touch screen device may further comprise: determining a space to which a position of the contact of the user's finger with the touch screen of the touch screen device belongs, wherein the touch screen comprises a plurality of spaces. Moreover, operation 220 comprises: determining key(s) corresponding to the identified finger based on the correspondence relationship(s) between finger(s) and key(s) in the located space. For example, dividing the screen into a left-side space and a right-side space. In the left-side space, the correspondence relationship(s) between the finger(s) and key(s) is(are) for example the correspondence relationship(s) in the above example; while in the right-side space, different fingers, for example, correspond to Shift and numeral keys, respectively. When the position of the contact between the user's finger and the touch screen belongs to the left-side space, the corresponding key(s) is(are) determined based on the correspondence relationship(s) between the finger(s) and the key(s) in the left-side space; when the position of the contact between the user's finger and the contact area belongs to the right-side space, then the corresponding key(s) is(are) determined based on the correspondence relationship(s) between the finger(s) and the key(s) in the right-side space. For example, the screen may also be divided into a central space and a peripheral space, where in the central space different fingers have correspondence relationship(s) with corresponding key(s) respectively, while in the peripheral space, the keys are fixed and any finger may be used to contact these fixed keys. Through partitioning different spaces, the correspondence relationship(s) between finger(s) and key(s) is (are) richer, which further improves user's input speed.

The above various embodiments may refer to each other so as to combine to obtain more embodiments.

Figure 4:
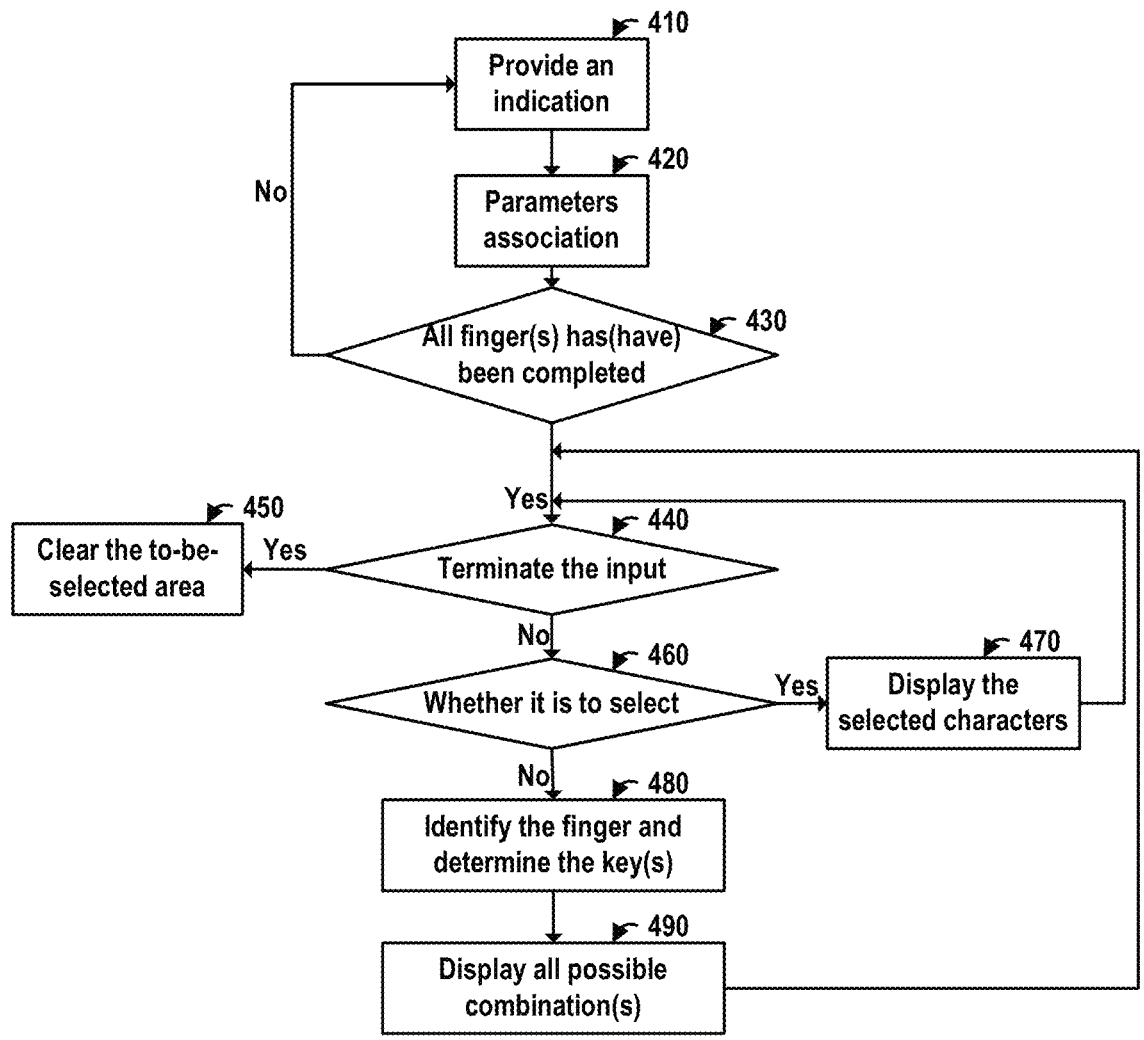
FIG. 4 shows a flowchart diagram of an information processing method for a touch screen device according to embodiments of the present invention.

Hereinafter, take the method as shown in FIG. 4 as an example, an information processing method for a touch screen device as provided in one embodiment of the present invention will be described in detail. In operation 410, indication is provided to a user to require the user to contact the touch screen with a particular finger; in operation 420, in response to the user contacting the touch screen with a finger, parameters of the finger are associated with the particular finger; in operation 430, it is determined whether all finger(s) have been associated with the parameter, and if so, the process proceeds to operation 440; and if not, the process returns to operation 410; in operation 440, in response to the user contacting the touch screen with a finger, it is determined whether it is terminating the input; if so, the flow proceeds to operation 450, and if not, the process proceeds to operation 460; in operation 450, a to-be-selected area is cleared; in operation 460, it is determined whether it is to select; if so, the process proceeds to operation 470, and if not, the process proceeds to operation 480; in operation 470, the selected character is selected to wait for the user' next contact with the touch screen; in operation 480, a finger contacting the touch screen is identified, and based on the set relationship(s) between different finger(s) and key(s), key(s) corresponding to the identified finger is(are) determined; in operation 490, possible combination(s) is(are) displayed in the to-be-selected area to wait for the user's next contact with the touch screen. In the present embodiment, operations 410 to 430 are training phases for finger identification. When the user contacts the touch screen for the next time, operation 440 may be executed again. The method as shown in FIG. 4 is only an example and does not constitute a limitation to the present invention. Further, the present embodiment may further comprise validation during the training phase of finger identification, i.e., requiring the user to use a particular finger again according to a prompt, and then the finger is identified to determine whether the identified result is identical to the indication; if identical, the validation passes; if not, identification training on the finger is performed again. Implementation details of the present embodiment may refer to the embodiment as shown in FIG. 2, which will not be detailed here for concise.

Figure 5:
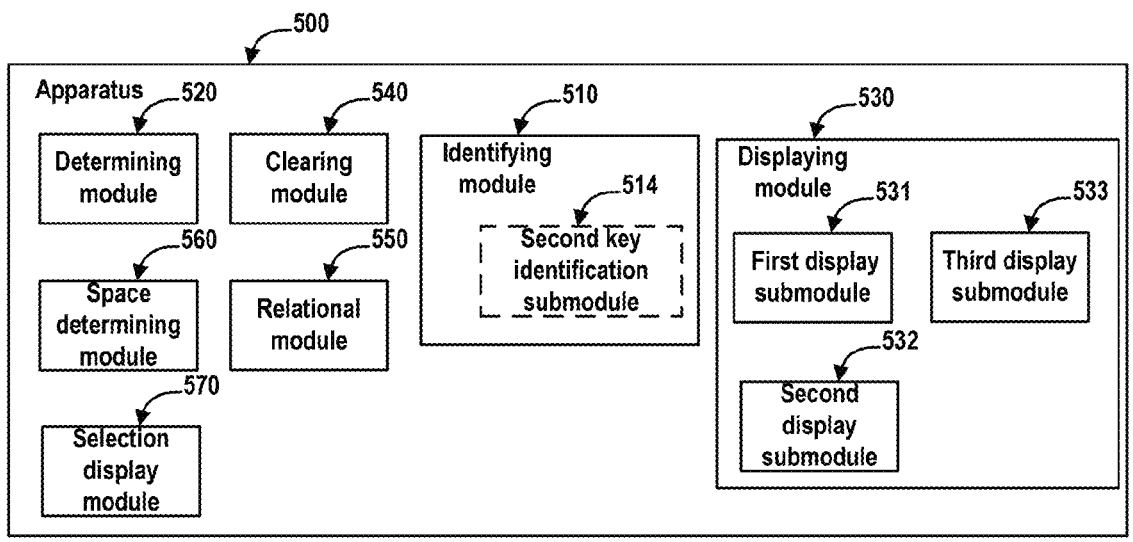
FIG. 5 shows a structural diagram of an information processing apparatus for a touch screen device according to embodiments of the present invention.

As shown in FIG. 5, embodiments of the present invention further provide an information processing apparatus 500 for a touch screen device. The apparatus 500 comprises: an identifying module 510 configured to, in response to contact of a finger of a user with a touch screen of the touch screen device, identify the finger contacting the touch screen; a determining module 520 configured to determine key(s) corresponding to the identified finger based on set correspondence relationship(s) between the finger(s) and the key(s); a displaying module 530 configured to display at least one character represented by the key corresponding to the identified finger.

Specific implementation details in the present embodiment may refer to the embodiments as shown in FIGS. 2 and 4, which will not be detailed here for concise. Through the apparatus provided in the present embodiment, the user is enabled to realize input without searching virtual key(s) on the touch screen, which reduces the user's mis-operation and improves the user's input speed.

In one embodiment of the present invention, the display module 530 may comprise at least one of the following sub-modules: a first display sub-module 531 configured to display in a to-be-input area at least one character represented by the key(s) corresponding to the identified finger; a second display sub-module 532 configured to display in a to-be-selected area the at least one character represented by the key(s) corresponding to the identified finger; and a third display sub-module 533 configured to display all characters represented by the key(s) corresponding to the identified finger. In the present embodiment, the specific implementation details and examples may refer to the embodiments as shown in FIGS. 2 and 4, which will not be detailed here for the sake of simplicity.

In one embodiment of the present invention, the second display sub-module 532 may comprise a first display sub-module configured to determine possible combination(s) of the characters already existing in the to-be-selected area and the characters represented by the key(s) corresponding to the identified finger, and display in the to-be-selected area at least one of the possible combination(s).

In one embodiment of the present invention, the apparatus 500 may further comprise a clearing module 540 configured to clear the to-be-selected area in response to the user terminating the input. Through clearing the to-be-selected area, the terminated input may be prevented from affecting the combination(s) displayed by subsequent input.

In one embodiment of the present invention, the apparatus 500 may further comprise a relational module 550 configured to display the correspondence relationship(s) between finger(s) and key(s). This display may prompt the user the correspondence relationship(s) between the finger(s) and key(s).

In one embodiment of the present invention, the apparatus 500 may comprise: a selection display module 570 configured to, in response to determining that the contact between the user's finger and the contact screen as performing a selection, display the selected characters.

In one embodiment of the present invention, the apparatus 500 may also comprise a space determining module 560 configured to determine a space to which the contact between the user's finger and the touch screen of the touch screen device belongs, wherein the touch screen comprises a plurality of spaces. In the present embodiment, the identifying module 510 may comprise a second key identification sub-module 514 configured to determine key(s) corresponding to the identified finger based on the correspondence relationship(s) between finger(s) and key(s) in the belonging space.

The above apparatus embodiments may combine with each other to obtain more embodiments.

Figure 6:
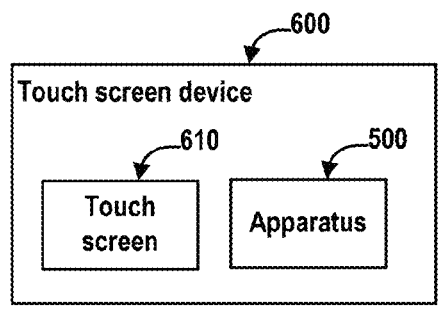
FIG. 6 shows a structural diagram of a touch screen device in embodiments of the present invention.

As shown in FIG. 6, the embodiments of the present invention further provide a touch screen device 600 including a touch screen 610 and the apparatus 500 as shown in FIG. 5. The user performs input through the touch screen 610; the apparatus 500 displays corresponding content on the touch screen 610 in response to the input.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combination(s) of blocks in the block diagrams and/or flowchart illustration, can be implemented by special purpose hardware-based systems that perform the specified functions or acts, or combination(s) of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. An information processing method for a touch screen device, the method comprising:
    associating, by a processor, one or more keyboard keys of a virtual keyboard with a user-finger;
    in response to contact of the user-finger with a touch screen of the touch screen device, irrespective of a location at which the user-finger contacts the touch screen, identifying the user-finger contacting the touch screen, wherein the user-finger is identified as being one of: left hand thumb, left hand index finger, left hand middle finger, left hand ring finger, left hand little finger, right hand thumb, right hand index finger, right hand middle finger, right hand ring finger, and right hand little finger;
    determining key(s) corresponding to the identified user-finger based the association between the user-finger and the key(s); and
    displaying at least one character represented by the key(s) corresponding to the user-finger, irrespective of the location at which the user-finger contacts the touch screen, without displaying a key corresponding to said at least one character on the touch screen.

2. The method according to claim 1, wherein the displaying the at least one character represented by the key(s) corresponding to the user-finger comprises at least one of the following:
    displaying in a to-be-input area the at least one character represented by the key(s) corresponding to the user-finger;
    displaying in a to-be-selected area the at least one character represented by the key(s) corresponding to the user-finger; and
    displaying all characters represented by the key(s) corresponding to the user-finger.

3. The method according to claim 2, wherein the displaying in a to-be-selected area the at least one character represented by the key(s) corresponding to the user-finger comprises:
    determining possible combination(s) of the characters already existing in the to-be-selected area and the characters represented by the key(s) corresponding to the user-finger; and
    displaying in the to-be-selected area at least one of the possible combination(s).

4. The method according to claim 3, further comprising, in response to the user terminating the input, clearing the to-be-selected area.

5. The method according to claim 1, further comprising displaying the association between the user-finger and key(s).

6. The method according to claim 1, further comprising displaying the at least one character in response to determining the contact between the user-finger and the touch screen as performing a selection.

7. The method according to claim 1, further comprising:
    determining a space to which a position of the contact between the user-finger and the touch screen of the touch screen device belongs, wherein the touch screen comprises a plurality of spaces; and
    wherein determining the key(s) corresponding to the user-finger based on the association between the user-finger and the key(s) comprises determining the key(s) corresponding to the user-finger based on the association between the user-finger and the key(s) in the belonging space.

8. The method according to claim 1, wherein the at least one character represented by the key(s) corresponding to the user-finger is displayed, irrespective of the location at which the user-finger contacts the touch screen and without displaying the virtual keyboard on the touch screen.

* * * * *